(12) United States Patent
Cox et al.

(10) Patent No.: US 11,614,017 B2
(45) Date of Patent: Mar. 28, 2023

(54) SYSTEMS AND METHODS FOR PROVIDING HEAT TO A CATALYST OF AN AFTER-TREATMENT SYSTEM

(71) Applicant: Ford Global Technologies, LLC, Dearborn, MI (US)

(72) Inventors: David Cox, London (GB); David Hesketh, Ingatestone (GB); Themi Petridis, Bishop's Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/325,426

(22) Filed: May 20, 2021

(65) Prior Publication Data

US 2022/0372905 A1 Nov. 24, 2022

(51) Int. Cl.
*F01N 9/00* (2006.01)
*F01N 3/20* (2006.01)
*F02D 41/02* (2006.01)
*F02D 41/06* (2006.01)

(52) U.S. Cl.
CPC ............ *F01N 9/00* (2013.01); *F01N 3/2006* (2013.01); *F02D 41/0235* (2013.01); *F02D 41/062* (2013.01); *F01N 2900/08* (2013.01); *F01N 2900/104* (2013.01); *F01N 2900/1411* (2013.01); *F01N 2900/16* (2013.01)

(58) Field of Classification Search
CPC ...... F01N 9/00; F01N 3/2006; F01N 2900/08; F01N 2900/104; F01N 2900/1411; F01N 2900/16; F02D 41/0235; F02D 41/062
See application file for complete search history.

(56) References Cited

U.S. PATENT DOCUMENTS

| | | | |
|---|---|---|---|
| 5,585,073 A | 12/1996 | Swars et al. | |
| 10,273,846 B2 | 4/2019 | Baensch et al. | |
| 2011/0131950 A1* | 6/2011 | Parnin | F01N 3/00 60/274 |
| 2017/0037799 A1* | 2/2017 | Balenovic | F02D 41/024 |
| 2020/0298701 A1* | 9/2020 | Meier | B60K 28/10 |
| 2021/0317766 A1* | 10/2021 | Viault | F01N 3/2066 |
| 2021/0372310 A1* | 12/2021 | Bare | F01N 3/2013 |

FOREIGN PATENT DOCUMENTS

| | | |
|---|---|---|
| KR | 101611035 | 4/2016 |
| WO | WO2020074292 | 4/2020 |

* cited by examiner

*Primary Examiner* — Brandon D Lee
(74) *Attorney, Agent, or Firm* — Haley Guiliano LLP

(57) ABSTRACT

Methods and system are provided to heat a catalyst of an after-treatment system for a vehicle. The after-treatment system comprises a heating module having a plurality of heating elements. Each of the plurality of heating elements is independently operable to provide thermal energy to the catalyst of the after-treatment system. One or more of the heating elements of the heating module are selectively operated to provide heat to the catalyst based on an operational parameter of the after-treatment system.

16 Claims, 12 Drawing Sheets

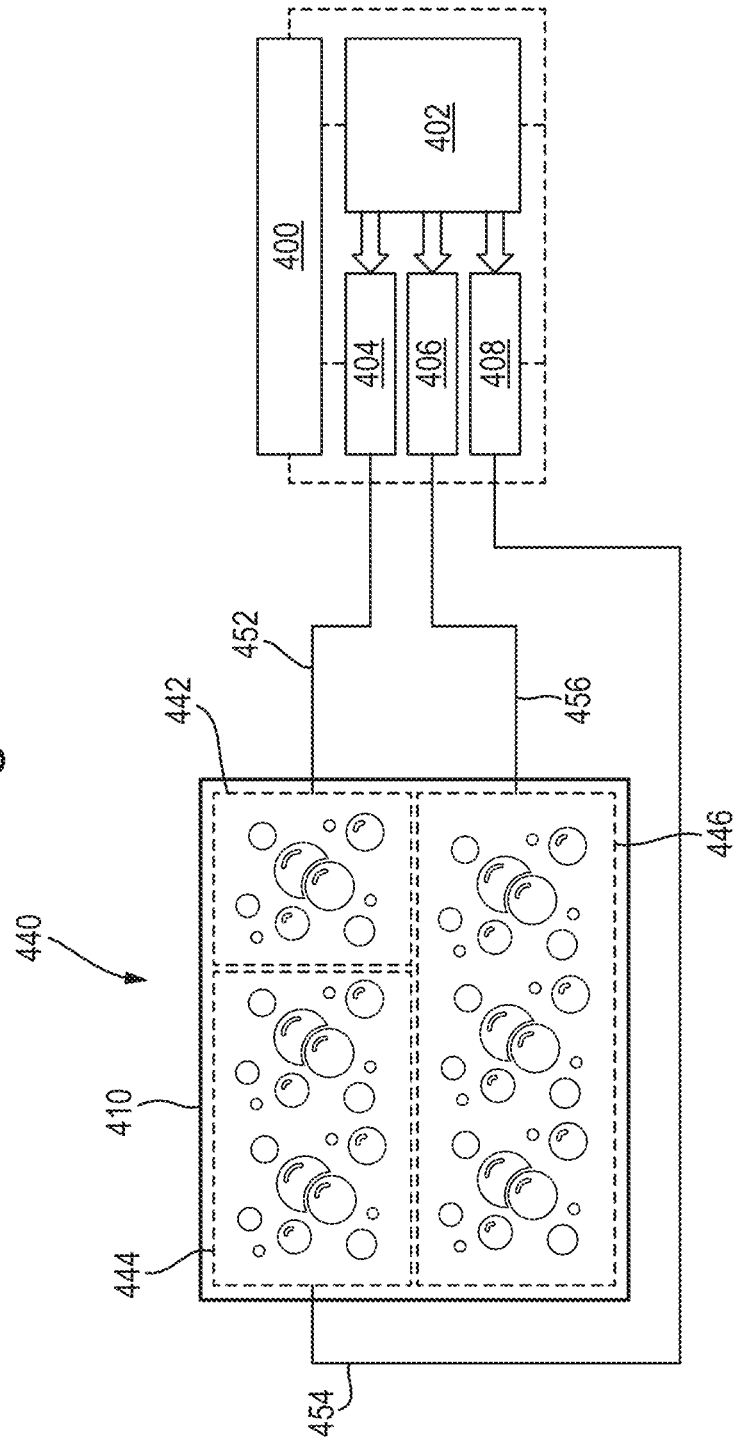

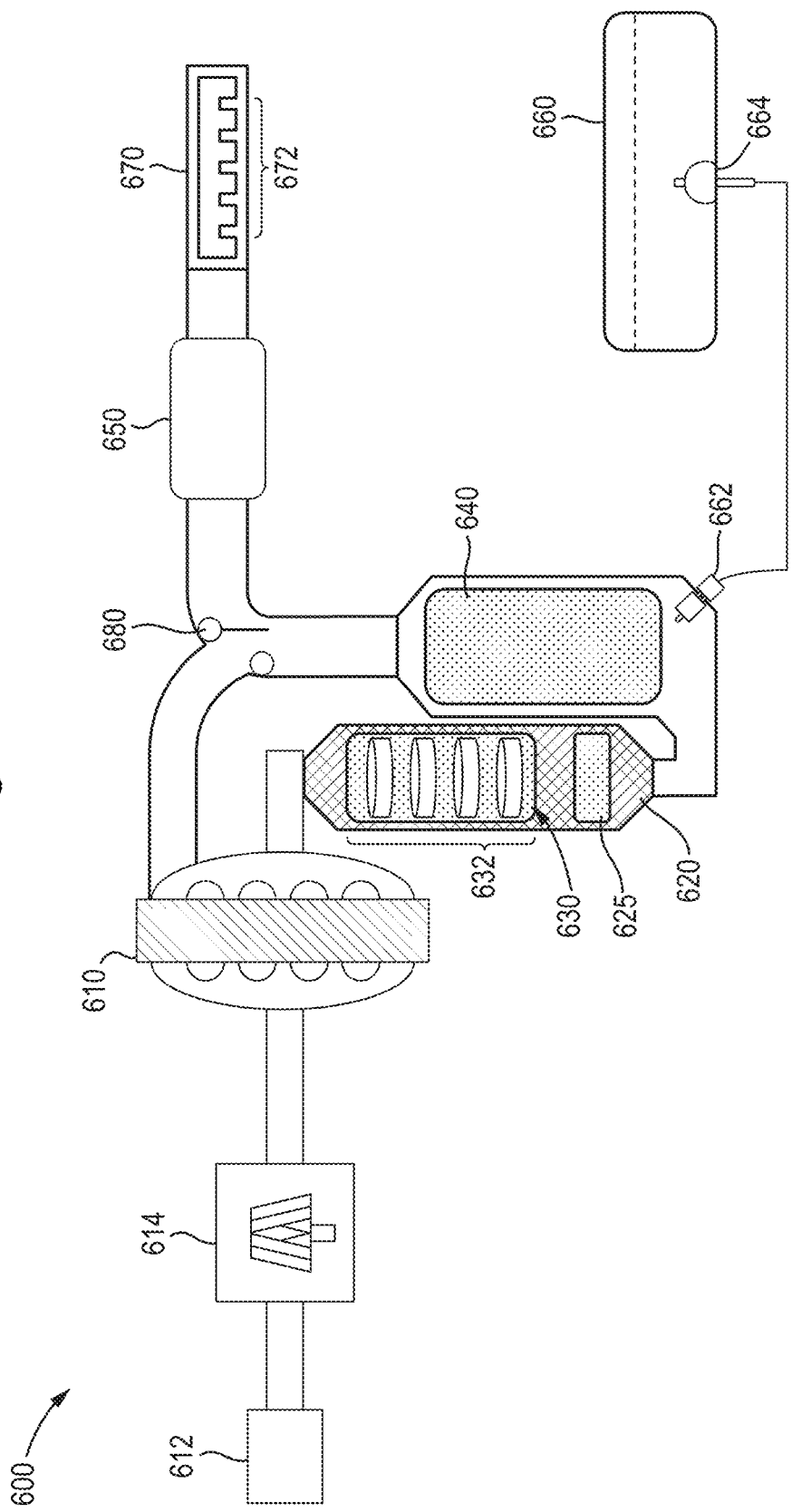

SYSTEMS AND METHODS FOR PROVIDING HEAT TO A CATALYST OF AN AFTER-TREATMENT SYSTEM

BACKGROUND

The present disclosure relates to systems and methods for controlling a heating element for providing heat to a catalyst of an after-treatment system, more particularly, but not exclusively, to systems and methods for selectively operating a heating module of an after-treatment system of a hybrid vehicle to improve hybrid battery durability.

SUMMARY

Through consumer demand and local regulation, the need for reduced engine emissions has led to engine exhaust systems that comprise catalytic converters. Catalytic converters are a specific type of engine after-treatment system that reduces pollutants in exhaust gases by catalyzing a redox reaction. Catalytic converters are located downstream of the engine within a structure/housing in the exhaust system, that is designed to contain and direct exhaust gases over and/or through the catalytic converter. Like many after-treatment systems, catalytic converters require heating up to be most effective. As the demand for cleaner emissions increases and legislation requires a reduction in the pollutants produced by internal combustion engines, solutions involving exhaust after-treatment systems are increasingly desired.

According to examples in accordance with an aspect of the disclosure, there is provided a method of providing heat to a catalyst of an after-treatment system, e.g., of a vehicle. The after-treatment system comprises a heating module having a plurality of heating elements. Each of the plurality of heating elements is independently operable to provide thermal energy to the catalyst of the after-treatment system. The method comprises selectively operating one or more of the heating elements of the heating module to provide heat to the catalyst based on one or more operational parameters of the after-treatment system and/or the vehicle.

In some examples, the method further comprises determining how many of the plurality of heating elements to selectively operate to achieve a threshold temperature of the catalyst, e.g., an optimum operating temperature of the catalyst. For example, it may be determined that to meet the threshold temperature, all of the heating elements will need to be operated. In some examples, it may be determined that to meet the threshold temperature, a subset of the plurality of heating elements will need to be operated. In some examples, the threshold temperature of the catalyst is achieved within a time threshold. For example, a time threshold may be set as a limiting period in which the catalyst should achieve the threshold temperature. In this way, more heating elements of the heating module may be selectively operated to meet both the threshold temperature and the time threshold. In some examples, in response to determining that the threshold temperature has been achieved, one or more, e.g., a subset, of the plurality of heating elements of the after-treatment system may be deactivated.

In some examples, the one or more operational parameters comprise at least one of a energy throughput of a battery, an engine temperature, an exhaust gas flow-rate through the after-treatment system, a thermal energy output from each of the plurality of heating elements, a maximum thermal energy output from the plurality of heating elements, and/or an amount of particulate matter in the after-treatment system. Energy throughput is the total amount of energy a battery can be expected to store and discharge over its lifetime. In some examples, the energy throughput may be associated with an energy usage profile of an HEV battery.

In some examples, the method further comprising determining one or more contextual factors, wherein the one or more contextual factors comprise at least one of an ambient temperature, a state of charge of a power source of the vehicle (e.g., a hybrid vehicle battery), a time since a last engine start-up, and/or a delta temperature between the temperature of the after-treatment system and the ambient temperature. In some examples, at least one of the plurality of heating elements of the heating module is selectively operated to provide heat to the catalyst based on one or more of the contextual factors.

In some examples, the method further comprises starting an engine of the vehicle after the after-treatment system reaches the threshold temperature. In some examples, the method further comprises starting the engine based on the one or more contextual factors. In some examples, the method further comprises starting the engine based on the one or more operational parameters. For example, the engine start-up procedure may be altered based on the one or more contextual factors and/or the one or more operational parameters.

According to a second example in accordance with an aspect of the disclosure, there is provided an after-treatment system comprising a heating module. The heating module comprises a plurality of heating elements, wherein each of the plurality of heating elements is independently activatable to provide thermal energy to a catalyst of the after-treatment system.

In some examples, each of the plurality of heating elements has the same thermal output power. For example, each of the plurality of heating elements may have 2 kW (2000 Watts) of thermal output. In some examples, each of the plurality of heating elements has a different thermal output power. For example, a first heating element may have 1 kW of thermal output and a second heating element may have 3 kW of thermal output. It should be understood that the aforementioned values of thermal output power and the number of heating elements are merely intended as illustrative and are non-limiting, and that other values of thermal output power may also be used and are intended to fall within the present disclosure. For example, there may be a total of ten heating elements of 400 W (400 Watts) of thermal output or five heating elements of various thermal output totaling 4 kW (4000 Watts) of thermal output. In some examples, the total amount of thermal output of the plurality of heating elements of the heating module may vary for any given catalyst based on the one or more contextual factors or the one or more operational parameters.

In some examples, the plurality of heating elements are spatially separated, e.g., within the heating module. For example, the heating elements may be concentric coils occupying the same spatial region within the heating module, but each heating element may be spatially separated from the next heating element within that region. In some examples, the plurality of heating elements occupy the same spatial region and are electrically insulated from one another. For example, the heating elements may be different portions of a metallic foam (e.g., of unitary structure) that are electrically isolated from each other. In some examples, the heating module of the after-treatment system is connected to a high voltage power source, e.g., a power source of a hybrid electric vehicle (HEV) such as a hybrid battery.

According to a third example in accordance with an aspect of the disclosure, there is provided a vehicle. The vehicle comprises an after-treatment system. The after-treatment system comprising a heating module comprising a plurality of heating elements, wherein each of the plurality of heating elements is independently activatable to provide thermal energy to a catalyst of the after-treatment system.

According to a fourth example in accordance with an aspect of the disclosure, there is provided a non-transitory computer-readable medium having instructions encoded thereon for carrying out a method to provide heat to a catalyst of an after-treatment system for a vehicle, the after-treatment system comprising a heating module having a plurality of heating elements, wherein each of the plurality of heating elements is independently operable to provide thermal energy to the catalyst of the after-treatment system, the method comprising selectively operating one or more of the heating elements of the heating module to provide heat to the catalyst based on an operational parameter of the after-treatment system.

For the avoidance of doubt, the system and methods for providing heat to a catalyst of an after-treatment system for a vehicle, according to any of the examples described herein, may be used to improve the emissions of a vehicle. Whilst the benefits of the systems and method may be described by reference to hybrid vehicles, it is understood that the benefits of the present disclosure are not limited to such types of vehicle, and may also apply to other types of vehicles, such as forklifts, trucks, buses, locomotives, motorcycles, aircraft and watercraft, and/or non-vehicle based systems that utilize a catalytic converter, such as electrical generators, mining equipment, stoves, and gas heaters.

These examples and other aspects of the disclosure will be apparent and elucidated with reference to the example(s) described hereinafter. It should also be appreciated that particular combinations of the various examples and features described above and below are often illustrative and any other possible combination of such examples and features are also intended, notwithstanding those combinations that are clearly intended as mutually exclusive.

BRIEF DESCRIPTION OF THE DRAWINGS

The above and other objects and advantages of the disclosures herein will be apparent upon consideration of the following detailed description, taken in conjunction with the accompanying drawings, in which:

FIGS. 4A to 4C illustrate exemplary heating elements of a heating module for providing heat to a catalyst of an after-treatment system, in accordance with at least one of the examples described herein.

FIG. 6 illustrates an exemplary exhaust system comprising an after-treatment system, in accordance with at least one of the examples described herein.

DETAILED DESCRIPTION

Figure 1:
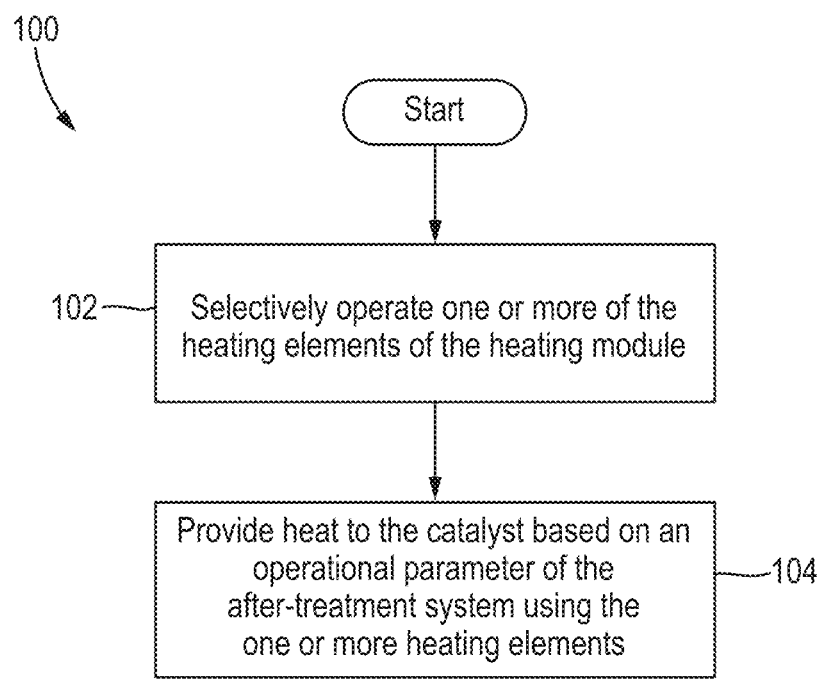
FIG. 1 illustrates an example flow chart of a method of providing heat to a catalyst of an after-treatment system for a vehicle, in accordance with at least one of the examples described herein.

It should be understood that the detailed description and specific examples herein, while indicating exemplary embodiments, are intended for purposes of illustration only and are not intended to limit the scope of the disclosure. These and other features, aspects, and advantages of the present disclosure will become better understood from the following description, appended claims, and accompanying drawings. It should be understood that the Figures are merely schematic and are not drawn to scale. It should also be understood that the same or similar reference numerals are used throughout the Figures to indicate the same or similar parts.

As discussed briefly above, current regulations on emissions standards are requiring manufacturers of internal combustion engines to reduce the operating emissions from the engines they manufacture. These engines are used in any appropriate type of vehicle, such as an automobile, a motorbike, a marine vessel, or an aircraft. In particular, the vehicle may be any appropriate type of hybrid vehicle, such as a Hybrid Electric Vehicle (HEV), a Plug-in Hybrid Electric Vehicle (PHEV), a Mild Hybrid Electric Vehicle (mHEV), or any other vehicle having an engine and an electrified powertrain. Typically, hybrid vehicles use two or more distinct types of means to store energy, such as batteries to store electrical energy and gasoline/diesel to store chemical energy. The basic principle of hybrid vehicles is that the different types of motors have diverse efficiencies under different conditions, such as top speed, torque, or acceleration and therefore switching from one type of motor to another yields greater efficiencies than either one could have their own. However, under the proposed new emissions standards in markets such as the European Union (EU), North America, and the United Kingdom (UK), the increased efficiencies of hybrid vehicles may be insufficient to satisfy new emission standards.

One solution to reduce the toxic emissions of vehicles is the use of an exhaust after-treatment system. Exhaust after-treatment systems aim to reduce hydrocarbons, carbon monoxide, nitrous oxide, particulate matter, sulfur oxide, and volatile organic compounds such as chlorofluorocarbons. Examples of exhaust after-treatment systems include air injection (or secondary air injection), exhaust gas recirculation, and catalytic converters.

Electrically heated catalysts, or eCATs, are a type of catalytic converter, which have been in use for a number of years. An eCAT typically comprises a heating element disposed within, or near to, a catalyst. eCATs are required in various use cases and will demand a power supply between 0-4 kW (0 to 4000 Watts) for example, depending on the use case. For example, the heating elements within the eCATs will have a thermal output of 0-4 kW (0 to 4000 Watts). An eCAT typically has low inductance and therefore the power consumption can be changed rapidly. The eCAT demand is supported by a hybrid powertrain electrical system in an HEV, mHEV, or PHEV platform. For example, in a cold start use case, the eCAT will demand am eCAT rated power (e.g., ~4 kW) to maintain aftertreatment temperature. In some examples, the power control module (PCM) demands the eCAT rated power from the HEV system for ~200 seconds. This load will be supported by the hybrid battery transiently until the e-machine can respond to support the load. However, in some use cases in which the e-machine can't support the total demand, the battery will need to support the eCAT power supply.

In some examples, the eCAT will be required to perform a heat maintenance use case. To support the intermediate power levels for a 'heat maintenance' use case, a power (e.g., ~2 kW) less than the rated power (e.g., ~4 kW) of the device may be required. For example, the hybrid battery of the HEV system will be switched on (4 kW) and off (0 kW) through Pulse Width Modulation (PWM) to generate an average 2 kW power supply, as will be described in more detail with regard to FIG. 3. This cycling of the battery will increase the battery energy throughput, aging the battery.

Accordingly, in some examples, an after-treatment system comprising a catalyst and a plurality of heating elements of a heating module is disclosed, as is described in more detail below. The after-treatment system comprises a heating module comprising a plurality of heating elements, wherein each element of the plurality of heating elements are able to be selectively operated. For example, each heating element may be activated and/or deactivated separately. In this way, each heating element could have a lower power consumption than the maximum power required to support the worst-case use case (e.g., a cold start use case at ~4 kW demand as mentioned previously). In some examples, in a total activation approach, wherein all of the plurality of the heating elements are selectively operated, the maximum power demand could still be satisfied to support the worst-case use case power demand. In some examples, in an intermediate power demand use case, such as 'heat maintenance', any number, e.g., some, of the plurality of heating elements could be selectively activated to satisfy the power demand to meet catalyst light-off In one example with two heating elements, each element could be rated at 2 kW power, and therefore only one of the elements would be required to satisfy the power demand for the 'heating maintenance' case. This approach is advantageous, as the PWM switching approach would no longer be required and, consequently, the energy throughput and impact on battery life would be reduced, e.g., as shown in more detail with regard to FIGS. 5A and 5B.

In particular, the systems and methods described herein may be used to address the light-off procedure of a catalyst in an eCAT of hybrid vehicles, and/or to increase the life of the battery of the hybrid vehicle, e.g., by minimizing the HEV battery energy throughout during eCAT use; and further limit the degradation in its discharge and charge performance over its life, e.g., by reducing the energy throughput and internal resistance increase over usage. For the avoidance of doubt, any of, or at least any part of, the system architectures described below may be implemented in any appropriate hybrid vehicle, and are not limited to implementation in any one type of hybrid vehicle.

FIG. 1 illustrates an example flow chart of a method of providing heat to a catalyst of an after-treatment system for a vehicle, in accordance with at least one of the examples described herein. In some examples, the after-treatment system comprises a heating module having a plurality of heating elements. Each of the plurality of heating elements is independently operable, e.g., controllable, activatable and/or deactivatable, to provide thermal energy to the catalyst of the after-treatment system. Process 100 starts at step 102 where one or more heating elements of the heating module are selectively operated. For example, one or some of the plurality of the heating elements may be more desirable to selectively operate than one or more other heating elements, e.g., based on achieving the target after-treatment temperature threshold with the minimum increase in HEV battery energy throughput, thermal output and/or proximity to the catalyst.

At step 104, heat is provided to the catalyst based on an operational parameter of the after-treatment system using one or more heating elements of the heating module. In some examples, the operational parameter is an operational parameter of the after-treatment system. In some examples process 100, comprises a step of selectively operating one or more of the heating elements of the heating module to provide heat to the catalyst based on one or more operational parameters of the after-treatment system. However, the method may comprise a plurality, e.g., two steps. In this way, the order of the steps in FIG. 1 is for illustrative purposes and, in some examples, step 104 may precede 102.

In some examples, the one or more operational parameters comprise at least one of an engine temperature; an exhaust gas flow rate through the after-treatment system; a maximum thermal energy output from the plurality of heating elements; and/or an amount of particulate matter in the after-treatment system. For example, if the ambient temperature of the environment of the after-treatment system is very low, more thermal energy may be needed to be supplied to the heating element to ensure that the after-treatment system is sufficiently preheated.

In some examples, providing heat to the catalyst of the after-treatment system may be reliant, at least in part, upon airflow passing over the heating element to transfer the thermal energy to the catalyst and to protect the element from overheating. Therefore, before engine start and thus without the exhaust gas flow of a running engine, a pump may be added to the system to enable the transfer of thermal energy from the eCAT to the catalyst by generating airflow in the exhaust to transfer the thermal energy from the heating element to the catalyst. In some examples, this may include adding a pump to the exhaust gas recovery (EGR) circuit or utilizing (or repurposing) an e-compressor of the vehicle.

Figure 2:
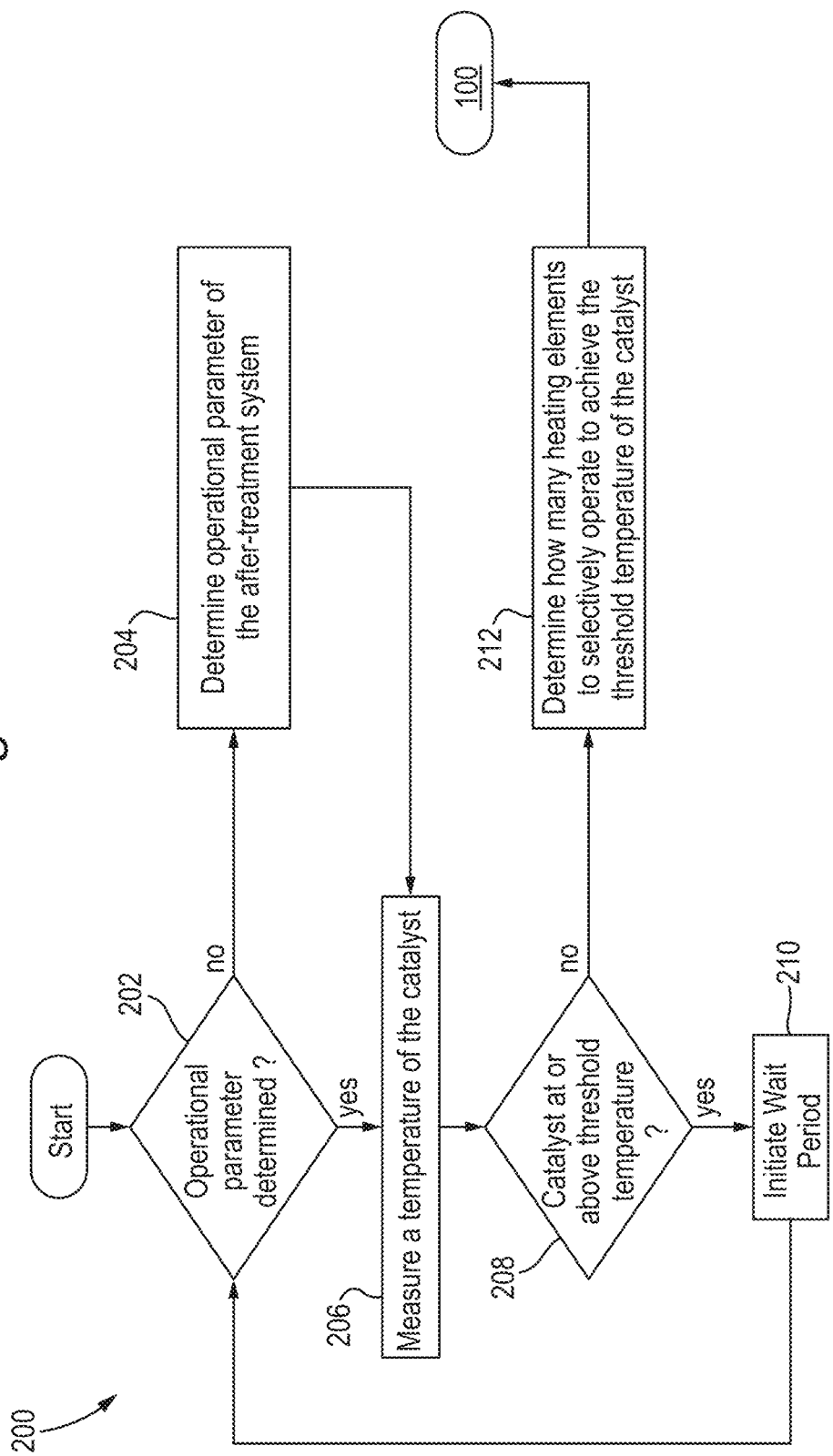
FIG. 2 illustrates an example flow chart of a method of providing heat to a catalyst of an after-treatment system for a vehicle, in accordance with at least one of the examples described herein.

FIG. 2 illustrates an example flow chart of a method of providing heat to a catalyst of an after-treatment system for a vehicle, in accordance with at least one of the examples described herein. In some examples, the after-treatment system comprises a heating module having a plurality of heating elements. Each of the plurality of heating elements is independently operable to provide thermal energy to the catalyst of the after-treatment system. Process 200 starts at step 202, a decision is made on whether or not an operational parameter has been determined. In response to step 202, process 200 continues to step 204 if the answer to step 202 is no. At step 204, an operational parameter of the after-treatment system is determined. Operational parameters are variables linked to the exhaust after-treatment system or the engine as a whole. For example, battery energy throughput, an engine temperature, an exhaust gas flow-rate through the after-treatment system, a maximum thermal energy output from the plurality of heating elements, or an amount of particulate matter in the after-treatment system. If the answer to step 202 is yes and an operational parameter has been determined, or after step 204 has been completed, process 200 continues to step 206. Energy throughput is the total amount of energy a battery can be expected to store and deliver over its lifetime. In some examples, the energy throughput may be associated with an energy usage profile of an HEV battery.

At step 206, the temperature of the catalyst is measured. At step 208, is it determined whether the catalyst is at, or above, the threshold temperature. In response to the answer to step 208 being yes, process 200 continues to step 210. At step 210, a waiting period is initiated before the process returns to step 202. In some examples, if the response to step 208 is yes, the process 200 ends.

If the answer to step 208 is no, process 200 continues to step 212. At step 212, how many heating elements to selectively operate to achieve the threshold temperature of the catalyst is determined, with the minimal impact to HEV battery throughput. In some examples, in response to determining that the threshold temperature has been achieved, the method further comprises deactivating at least one of the plurality of heating elements of the after-treatment system, further reducing the impact to HEV battery throughput reducing the charging and discharging of the battery. After step 212, process 200 may continue to process 100 as described regarding FIG. 1 above. In particular, in some examples, process 200 further comprises selectively operating one or more of the heating elements of the heating module to provide heat to the catalyst based on an operational parameter of the after-treatment system. However, notably, selectively operating one or more of the heating elements may further be based on step 212.

In some examples, the after-treatment system includes an eCAT and a catalyst. The after-treatment system is heated until it reaches a threshold temperature, which may be the same as the most efficient temperature of the catalyst, e.g., for a given operating condition. In some examples, the threshold temperature may be above the most efficient temperature of the catalyst, to allow for some cooling effects between ending the heating of the after-treatment system and later starting an engine. In some examples, the threshold temperature may be below the most efficient temperature of the catalyst, to allow for heating from the engine exhaust to bring the catalyst up to its most efficient temperature.

In some examples, selectively operating one or more heating elements comprises operating a pulse-width modulation (PWM) switch electrically connected to the heating elements to modulate power from a power source to the heating elements of the after-treatment system. In some examples, it is step 104 that activates an eCAT to provide thermal energy to the after-treatment system.

Figure 3:
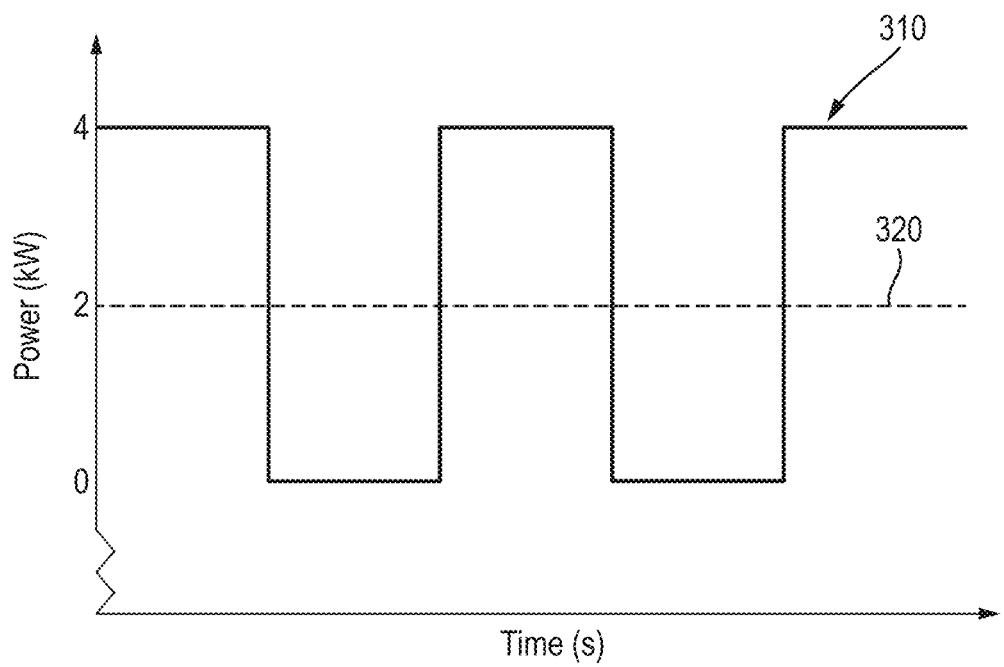
FIG. 3 illustrates the PWM switching of a hybrid system without the teachings of the present disclosure.

FIG. 3 illustrates the PWM switching of a hybrid system without the teachings of the present disclosure. Conventionally, an eCAT will be required to perform a heat maintenance use case. To support the intermediate power levels for a 'heat maintenance' use case, a low power (e.g., ~2 kW) less than the rated power (e.g., ~4 kW) of the device may be required. For example, as shown, the hybrid battery of the HEV platform system will be switched on (4 kW) and off (0 kW), this is shown by line 310 in FIG. 3. Through Pulse Width Modulation (PWM) the cycling on and off of, for example, a 4 kW power supply generates an average 2 kW power supply, as shown by line 320. This cycling of the battery will increase the battery energy throughput, aging the battery. Additional throughput will detract from the available battery life, which could otherwise have been utilized to support other system functions, and increases the internal resistance due to the battery cycling degrading the discharge and charge performance of the battery over time. Consequently, other system functions may be limited to ensure the battery remains functional at the expected end of vehicle life, which is crucial on an HEV in terms of supporting the voltage quality of the 12V system. One solution to overcome these issues is to increase the battery capacity to be durable despite the additional throughput; however, this solution will have a dramatic increase in cost, impact the packaging of the battery, increase the weight and have a further effect on the cooling requirements for the HEV platform.

Figure 4A:
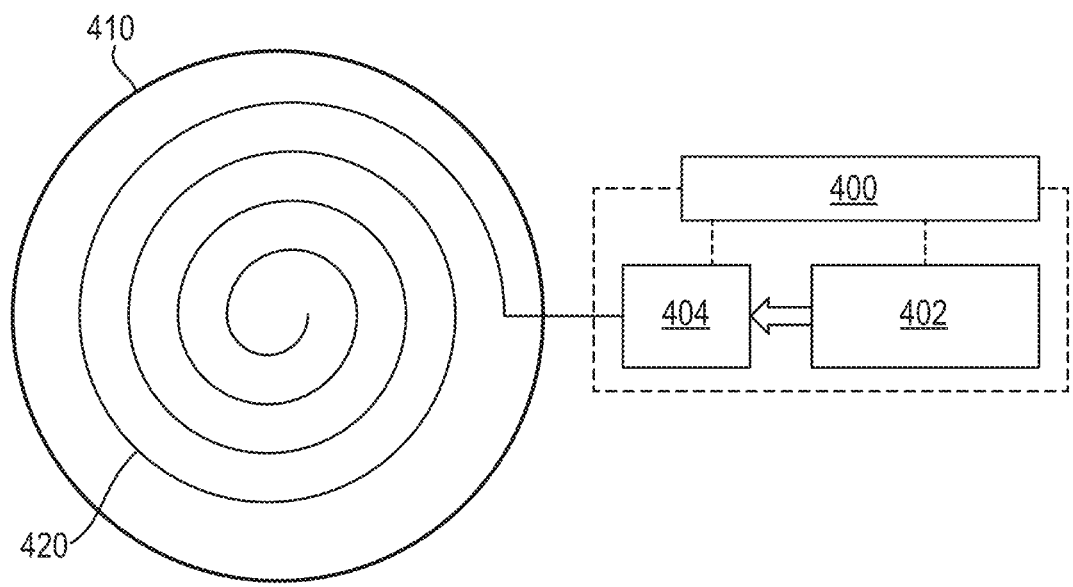
Figure 4B:
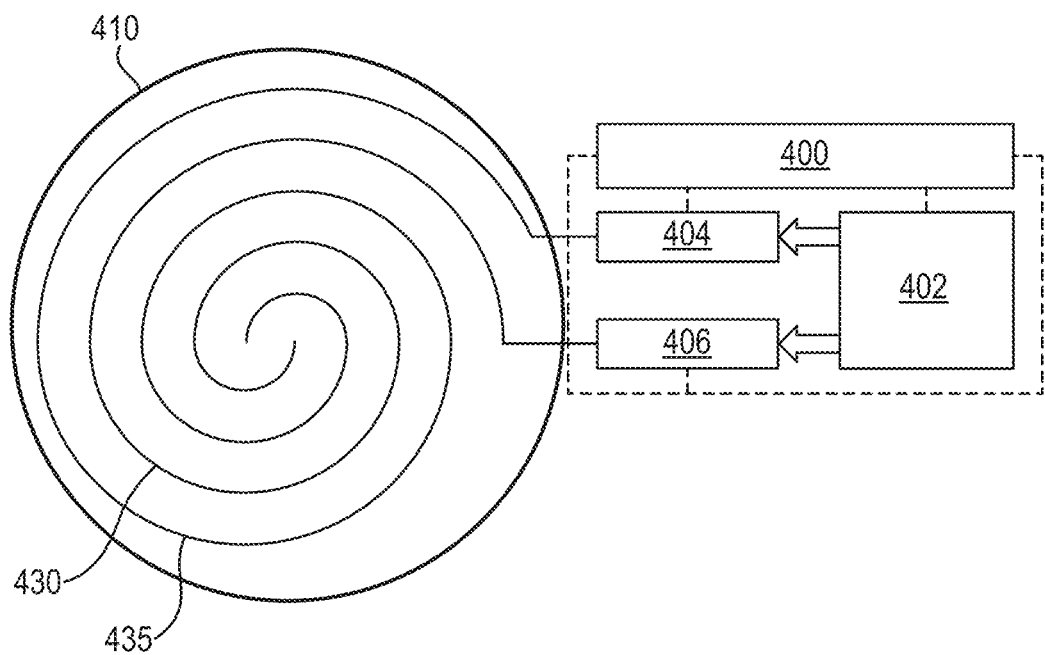

FIGS. 4A to 4B illustrate exemplary heating elements of a heating module for providing heat to a catalyst of an after-treatment system, in accordance with at least one of the examples described herein. With regard to FIG. 4A there is shown a heating module 410 comprising a heating element 420. Heating element 420 is controlled by a control module 400, (e.g., a powertrain control module). In some examples, the control module 400 controls a hybrid system 402 (e.g., a hybrid system power source, such as a high voltage power source). In some examples, the control module 400 controls a PWM switch 404, which is in turn electrically connected to the heating element 420. Heating module 410 comprises a plurality of heating elements 420, for example, two or more heating elements (not shown). In some examples, each of the plurality of heating elements has the same thermal output power. In other examples, two or more of the plurality of heating elements have a different thermal output power.

The plurality of heating elements may comprise various form factors including, but not limited to, a coil type or metallic foam type. For example, FIG. 4B illustrates a first heating element 430 and a second heating element 435 concentrically packaged in a disk volume arrangement. It should be understood that while two heating elements 430, 435 are shown, one or more additional heating elements are considered to be included in this disclosure. For example, arrangements may have more than two heating elements (e.g., 10 heating elements). In the arrangement as shown in FIG. 4B, the plurality of heating elements are spatially separated in such a way to allow thermal energy emitted from the heating elements to be carried away and to prevent a short circuit between the plurality of heating elements. This example may be referred to as the 'hockey puck' embodiment. In some examples, the heating elements 430, 435 are not arranged in a 'spiral' configuration but a linear (e.g., parallel heating elements), or in a polygon arrangement (e.g., with at least three straight sides and angles, and typically five or more, such as a honey-comb). In some examples, an electrical grid (rather than a coil) or a cone-based shape may be adopted. In some examples, each of the heating elements in the plurality of heating elements, for example, a first heating element 430 and second heating element are electrically connected to the first PWM switch 404 and second PWM switch, respectively. In some examples, a subset or group of the plurality of heating elements may be connected to the same PWM switch.

FIG. 4C illustrates a concept of a heating module 410 having a unitary structure and comprising a plurality of heating elements. In some examples, the heating module may comprise a metallic foam 440. As shown in FIG. 4C, different sections/portions of the metallic foam 440, for example, a first section 442, a second section 444, and a third section 446 are physically joined and electrically isolated from one another. Each of the sections 442, 444, and 446 of the metallic foam 440 are electrically connected to a separate PWM switch, for example, a first PWM switch 404, a second PWM switch 406, and a third PWM switch 408, respectively. In some examples, each of the sections 442-446 of the metallic foam 440 are connected to the PWM switches 404-408 and may each be considered to be independently powered, as shown by the connecting wires 452-456. In some examples, each of the sections 442-446 of the metallic foam 440 are considered to be the heating elements of the heating module. Accordingly, each of the sections 442-446 is selectively activatable. In some examples, as illustrated in FIG. 4C, each of the sections 442-446 of the metallic foam 440 may be of different form and/or size (e.g., a different surface area, and/or a different volume) relative to one another. In some examples, two or more of the sections 442-446 of metallic foam 440 may be the same, or similar, form and/or size (e.g., the same, or similar, surface area, and/or the same, or similar, volume).

Figure 5A:
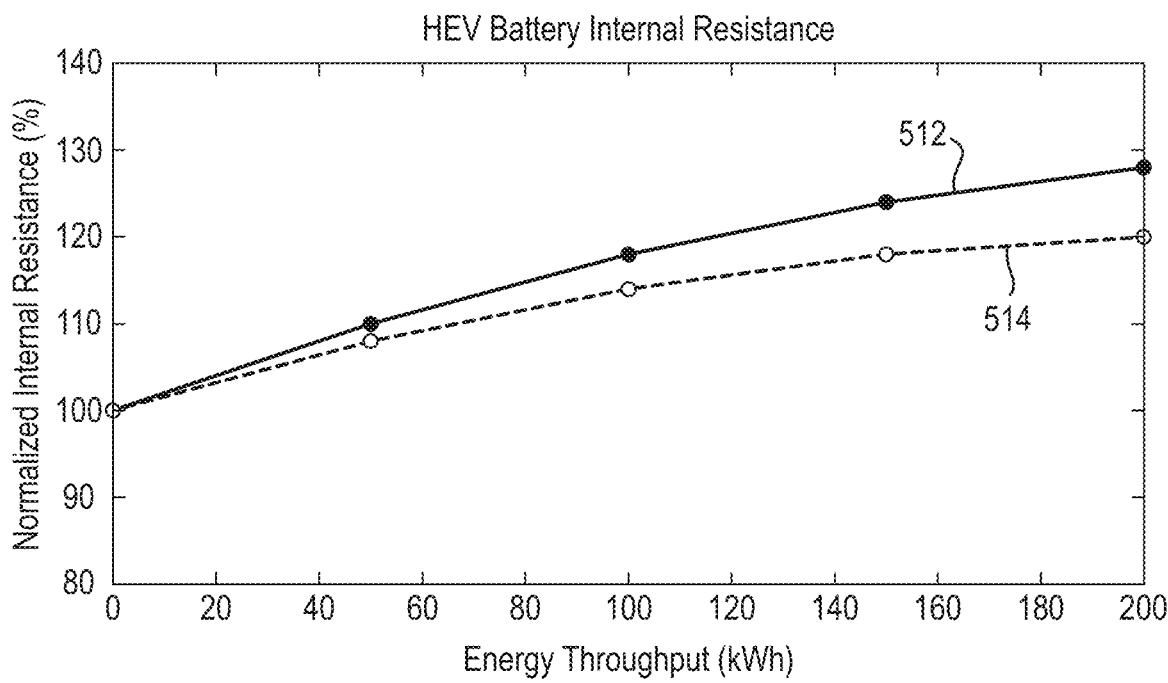
FIGS. 5A and 5B depict exemplary results achieved due to the implementation of the present disclosure, with respect to a hybrid battery, in accordance with at least one of the examples described herein.
Figure 5B:
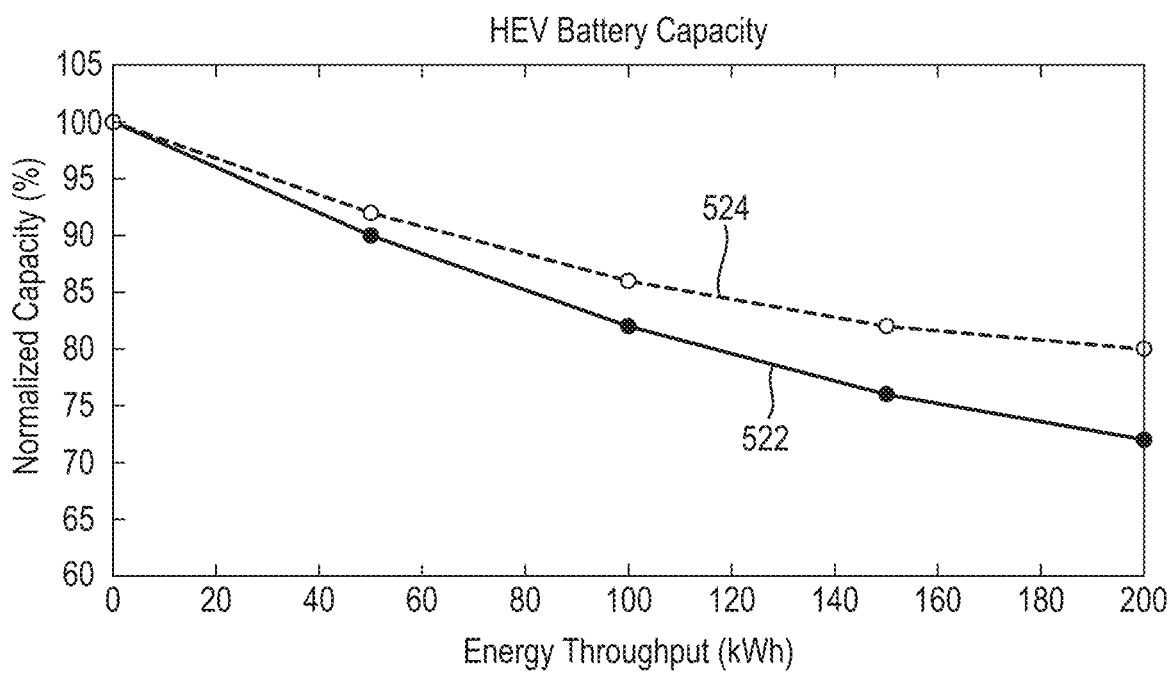

FIGS. 5A and 5B depict exemplary results achieved due to the implementation of the present disclosure, with respect to a hybrid battery, in accordance with at least one of the examples described herein. In particular, FIG. 5A depicts how the internal resistance of an HEV battery increases over lifetime usage (shown as energy throughput measured in kWh, kilowatt-hours). At 0 kWh, the battery may be considered new and therefore has a normalized internal resistance of 100%. Line 512 illustrates the normalized increase of internal resistance of an HEV battery as energy throughput increases in an implementation without the disclosures of the present application. Line 514 illustrates the normalized increase of internal resistance of an HEV battery as energy throughput increases in an implementation in accordance with at least one of the examples described herein. As shown, the rate of increase of the internal resistance of the HEV battery increases at a faster rate for the implementation without any of the examples as described herein. At 50 kWh of energy throughput in the HEV battery, the increase of the internal resistance as shown by line 512 is 110% and approximately 108% as shown by line 514; a delta, and therefore improvement, of 2%. At 200 kWh of energy throughput, however, the delta between lines 512 and 514 has increased to approximately 9%.

FIG. 5B depicts how the capacity of an HEV battery decreased over lifetime usage (shown as energy throughput measured in kWh). Line 522 illustrates the normalized decrease of capacity of an HEV battery as energy throughput increases in an implementation without the disclosures of the present application. Line 524 illustrates the normalized decrease of capacity of an HEV battery as energy throughput increases in an implementation in accordance with at least one of the examples described herein. At 0 kWh, both lines 522 and 524 are shown at 100% normalized capacity, indicating that both implementations start with full expected capacity. As shown, the rate of decrease of the capacity of the HEV battery increases at a faster rate for the implementation without any of the examples as described herein. At 50 kWh of energy throughput in the HEV battery, the decreased capacity of the HEV battery as shown by line 522 is at 90% and approximately 92.5% as shown by line 524; a delta, and therefore improvement, of 2.5%. At 200 kWh of energy throughput, however, the delta between lines 522 and 524 has increased to approximately 7.5%.

The values of the normalized data in FIGS. 5A & 5B is largely shown for illustration purposes. It should be understood that many other variables affect how the battery capacity and internal resistance of an HEV battery changes over its lifetime usage. However, these values have been generated with the assumption the only differences between the two implementations are the disclosures herein, to further illustrate the advantages and benefits of the present disclosure. In some examples, combinations of one or more of the examples disclosed herein may further improve the benefit gained as shown in FIGS. 5A & 5B.

FIG. 6 illustrates an exemplary exhaust system 600 comprising an engine 610 and an after-treatment system, comprising an eCAT 620. In some examples, the eCAT 620 comprises a catalyst 625 that is provided heat by the methods as described herein. In some examples, and as shown in FIG. 6, there is provided an air-box 612 connected to a compressor 614 to draw air from the atmosphere. The airbox 612 and compressor 614 are fluidly connected to engine 610 and after-treatment system to transfer thermal energy from a plurality of heating elements 632 disposed within the heating module 630 within the after-treatment system to the rest of the after-treatment system (e.g., to the catalyst 625). Due to the reduction in battery throughput, as illustrated in FIGS. 4A & 4B, additional devices can be added to the power net of the hybrid system. In some examples, to support local emissions regulations, additional systems such as an e-compressor 614 may be required. The saving in battery throughput, due to adopting a plurality of heating elements within the eCAT 620, enables an existing battery to support the throughput demands over the life of the vehicle, negating the need to increase the capacity and therefore cost of the battery.

In some examples, there is a diesel particulate filter 640 downstream of engine 610. A diesel particulate filter (DPF) is a filter that captures and stores exhaust soot, coke, and/or char, collectively referred to as particulate matter. The DPF is another form of after-treatment utilized to reduce emissions from diesel cars. DPFs have a finite capacity, the trapped particulate matter periodically has to be emptied or 'burned off' to regenerate the DPF, which an eCAT may also be used to assist with. This regeneration process cleanly burns off the excess particular matter deposited in the filter, reducing the harmful exhaust emission. In some examples, selectively operating one or more of the heating elements of the heating module to provide heat to the catalyst may be based on an amount of particulate matter in the after-treatment system. For example, if the amount of particular matter within the after-treatment system is determined to be above a threshold, more heating elements of the heating module can be selectively operated to regenerate the after-treatment system (e.g., the DPF).

In some examples, there is also provided a selective catalytic reduction (SCR) 650 system. An SCR is another emissions control technology system that injects a liquid-reductant agent through a special catalyst into the exhaust stream of engines, in particular diesel engines. The reductant source is usually automotive-grade urea, otherwise known as diesel exhaust fluid (DEF). The DEF sets off a chemical reaction that converts nitrogen oxides into nitrogen, water, and low amounts of carbon dioxide (CO2), which is then expelled through the vehicle tailpipe 670. The DEF may be stored in a DEF tank 660. The DEF may be distributed through a number of pumps and valves 662 and 664, as shown in FIG. 6. The number of pumps and valves 662 and 664 are for illustration purposes and additional pumps and valves 662 and 664 may be located throughout the exhaust and/or after-treatment system. The location of the pumps and valves 662 and 664 are similarly for illustration purposes and the location of the pumps and valves 662 and 664 can be different from that shown in FIG. 6.

In some examples, the exhaust system comprises a number of sensors 672 to detect the flue gas containing oxides of nitrogen (NOx) and oxides of sulfur (SOx), to ensure the final emissions are within a regulation amount. Euro 5 exhaust emission legislation and Euro 6 exhaust emission legislation, have effectively made it mandatory for DPFs, DEF, and SCRs to meet the emissions standards. However, future emission legislation, such as Euro 7, such technology alone may not be sufficient. The systems and embodiments described herein may replace, or work in conjunction with DPFs, DEF, and SCRs and meet the future standards.

In some examples, the exhaust system comprises an exhaust gas recovery system, which is enabled by an EGR switch 680. The EGR switch 680 enables some or all exhaust gas, or the thermal energy of the exhaust gas, to be recirculated through the exhaust system to further compound the heating effect of the heating elements 632 within the heating module 630.

Figure 7:
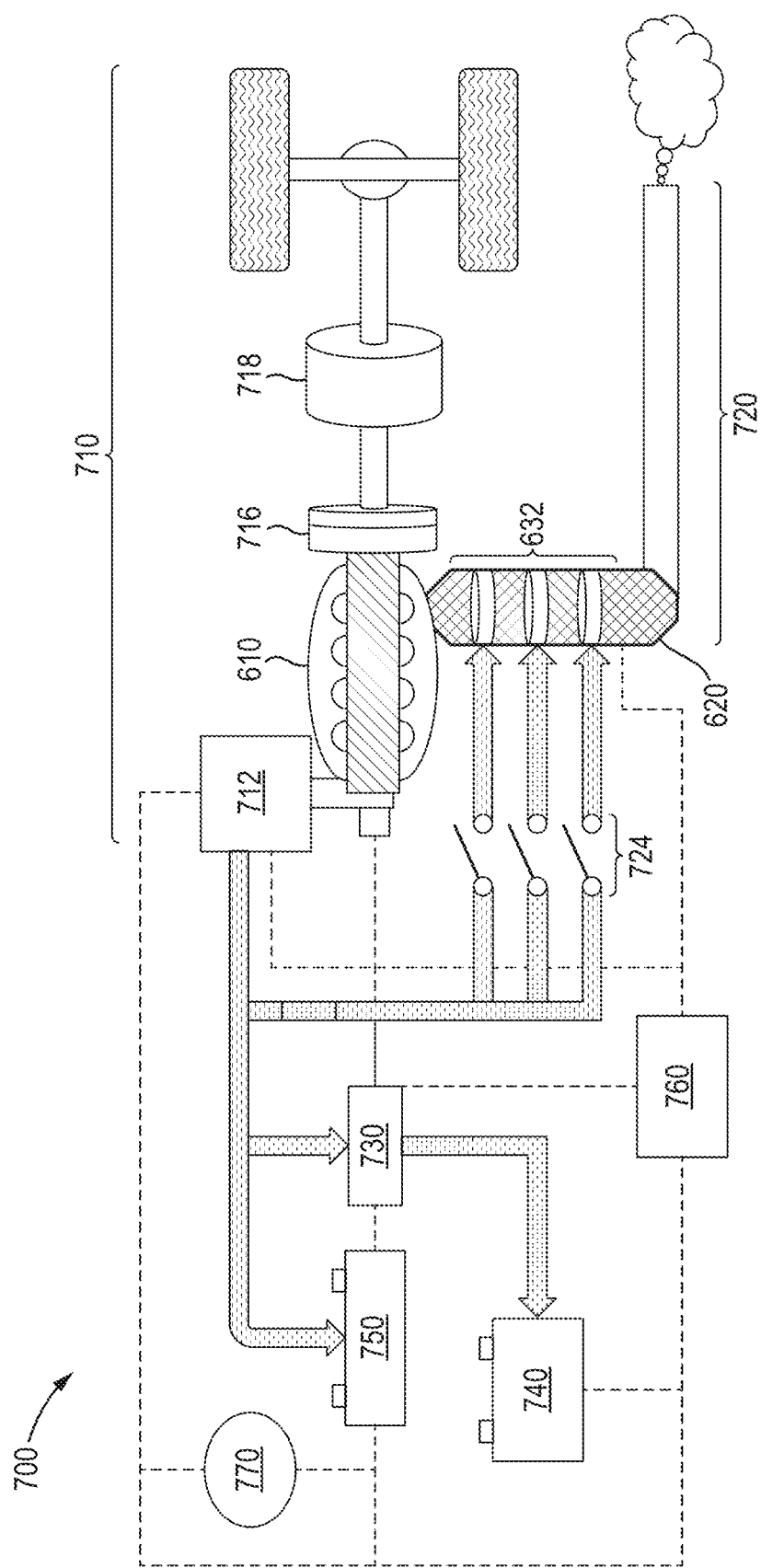
FIG. 7 illustrates an electrical power control system for a hybrid vehicle, in accordance with at least one of the examples described herein.

FIG. 7 shows a block diagram representing an electrical power control system 700 for a hybrid vehicle. In the example shown in FIG. 7, the power control system 700 is for an exemplary mHEV system architecture, in accordance with at least one of the examples described herein. Shown in FIG. 7 is a belt-integrated starter-generator (BISG) 712, which is a device that may apply positive torque and assist the engine in reducing the amount of work it has to do, or, in some examples, apply negative torque to generate electrical energy. The BISG 712 may be referred to as a motor-generator. The BISG 712 is integrated into the drive train 710, along with engine 610, clutch 716, and transmission 718. In some examples, the BISG 712 replaces a conventional non-hybrid engine's low voltage (e.g., 12V) alternator. In some examples, the BISG 712 transmits torque to the engine's crankshaft when it's operating as a hybrid drive motor, and the crankshaft transmits torque back to the BISG 712 when it operates as a generator, converting kinetic energy from the moving vehicle back into electricity, operating as a conventional alternator.

In some examples, the engine 610 has an exhaust system 720 comprising an eCAT 620. In some examples, the eCAT is electrically connected to a plurality of PWM switches 724. In some examples, the PWM switches 724 electrically connect a plurality of heating elements 632 to the eCAT 620. In the example shown in FIG. 7, a DC-DC converter 730 is electrically connected to a low voltage (e.g., 12V) battery and bus 740, which is configured to supply electrical power to one or more low voltage accessories of the HEV.

In the example shown in FIG. 7, the power control system 700 comprises a controller 760, e.g., an engine control module (ECM), may be in operational communication with each of the BISG 712, the engine 714, the DC-DC converter 730, the eCAT 620, the PWM switches 724, the plurality of heating elements 632, the low voltage battery and bus 740, the high voltage battery and bus 750 (e.g., an HEV power system), and a pump 770. The pump 770 may be a water pump as part of the low temperature liquid cooling circuit of the hybrid system. In some examples, the pump is fluidly connected to the components of the after-treatment system to transfer unwanted thermal energy from the components, away.

The present disclosure is not limited to the set-up shown in FIG. 7. For example, the controller 760 may be a stand-alone controller or any other appropriate controller of the hybrid vehicle. For example, the controller may, at least in part, be integrated with another controller of the vehicle. Furthermore, the controller 760 may be configured to operationally communicate with any one or more of the vehicle components shown in FIG. 7, and/or any other appropriate components of the vehicle. For example, controller 760 may be a stand-alone controller configured to operationally communicate with at least one high voltage accessory, an electric motor-generator, and an eCAT, to control the electrical power output of the high voltage battery 750.

While the example shown in FIG. 7 exemplifies the use of the control system 700 for an mHEV, it is understood that the control system 700 may be implemented on an appropriate type of hybrid vehicle, such as a plug-in hybrid electric vehicle (PHEV), having one or more high voltage circuit components and an eCAT 620. System 700, shown in FIG. 7, is configured to supply the electrical power output of a high voltage battery 750 of a hybrid vehicle to the eCAT 620 through the selectable operation of the plurality of heating elements 632 via PWM switches 724, as described in the examples above and below.

Figure 8:
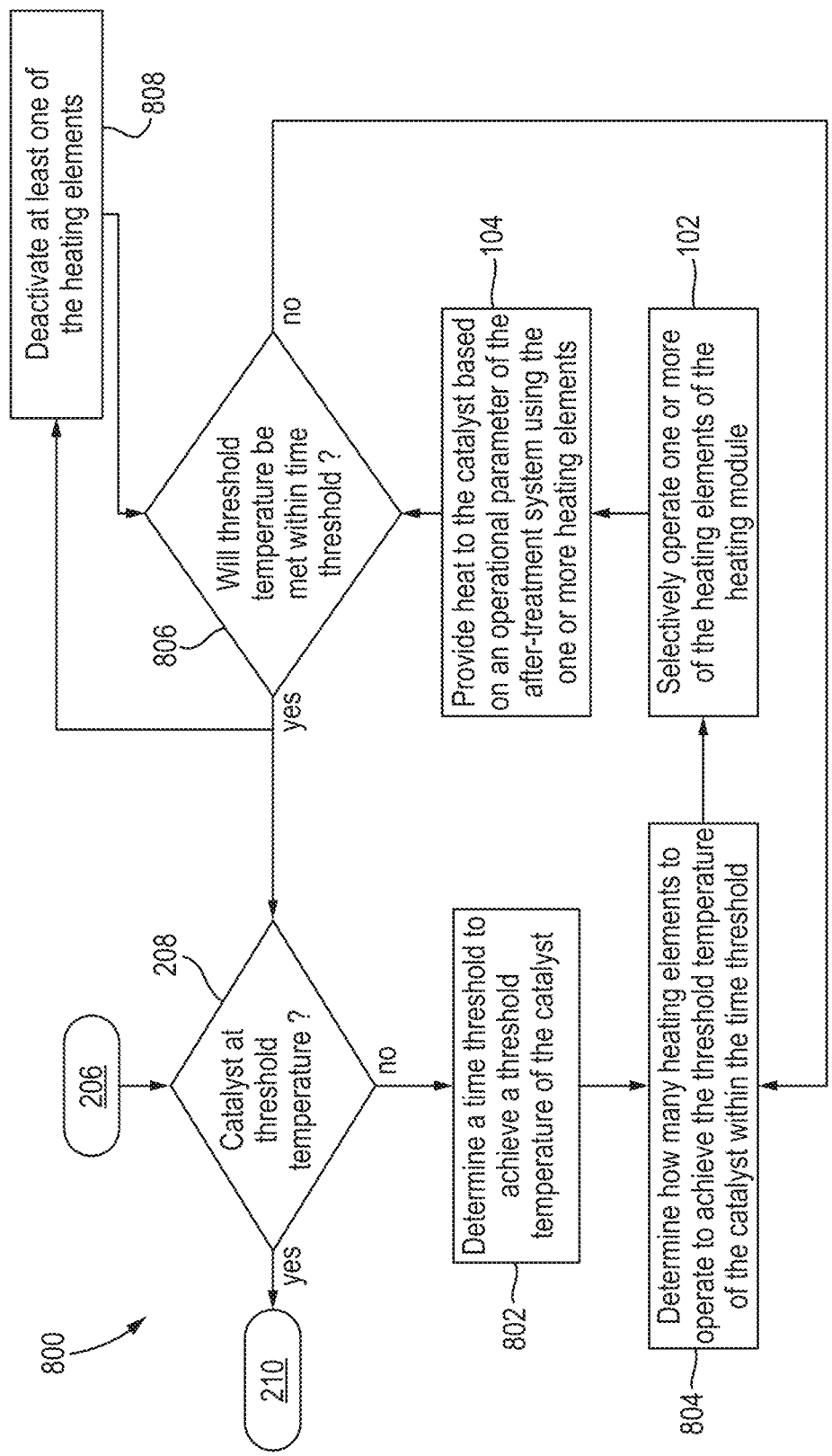
FIGS. 8 to 10 illustrate example flow charts of a method of providing heat to a catalyst of an after-treatment system for a vehicle, in accordance with at least one of the examples described herein.

FIG. 8 illustrates an example flow chart of a method of providing heat to a catalyst of an after-treatment system for a vehicle, in accordance with at least one of the examples described herein. In some examples, the after-treatment system comprises a heating module having a plurality of heating elements. Each of the plurality of heating elements is independently operable to provide thermal energy to the catalyst of the after-treatment system. In some examples, process 800 starts after step 206 of process 200, that is to say, that process 800 is an alternative or additional process to process 200. At step 206, the temperature of the catalyst has been measured (not shown). At step 208, is it determined whether the catalyst is at, or above, the threshold temperature. In response to the answer to step 208 being yes, process 200 continues to step 210. At step 210, a waiting period is initiated before the process returns to step 202.

In response to the answer of step 208 being no, in process 800, the process continues to step 802. At step 802, a time threshold to achieve a threshold temperature of the catalyst is determined. For example, the system may be determined that the catalyst has to reach the threshold temperature within a certain period of time, such as under one minute, to be compliant with local regulations. In some examples, the time threshold may be longer due to a user of the vehicle remotely initiating one or more processes 100, 200, 800, or 900. In some examples, the time threshold can be updated to be shorter or longer after process 800 has been initiated. For example, in response to determining the user gets out of the vehicle, the time threshold can be increased. In some examples, the time threshold can be increased based on one or more contextual factors and/or operational parameter(s). For example, if the ambient temperature is relatively high, the temperature of the catalyst is high, or the time since the last engine start was recent, then the time threshold may be increased due to the latent heat that is retained in the after-treatment system.

At step 804, how many heating elements to operate to achieve the threshold temperature of the catalyst within the time threshold is determined. For example, for a short time threshold, it may be necessary for all, or most, of the heating elements to be activated. For longer periods of time, fewer heating elements may be needed to reach the threshold temperature. In some examples, how many heating elements to operate is further based on the minimum impact to HEV battery energy throughput (as described previously, minimizing the throughput reduces the degradation of battery performance and aging over the HEV battery lifetime). There is a need to avoid switching between 0 kW and the rated power of the element to output an average power as this cycling degrades the life of the battery. Therefore, within the combination of elements, the number of elements activated may be selected based on the minimum throughput to meet the demanded eCAT power (i.e. use full rated power of 1 or more eCAT elements). In some examples, the full rated power of one or more eCAT elements may be used in conjunction with one or more eCAT elements being switched through PWM. However, because the power rating of the PWM switched elements is much lower than previously (i.e., without the present teachings) the overall effect of minimizing the throughput is achieved.

After step 804, the process continues to steps 102 and 104 of process 100. That is to say that one or more of the heating elements of the heating module are selectively operated (step 102) and heat is provided to the catalyst based on an operational parameter of the after-treatment system using one or more heating elements (step 104).

Alongside steps 102 and 104, in particular step 104, process 800 comprises step 806. Step 806 determines, or estimates, whether the threshold temperature of the catalyst will be met within the time threshold. Although this step is shown as succeeding step 104, step 806 may be performed in parallel with step 102 and/or step 104.

In response to the answer to step 806 being no, process 800 returns to step 804 to re-determine how many heating elements to operate to achieve the threshold temperature of the catalyst within the time threshold. In response to the answer to step 806 being yes, process 800 can continue onto step 808 and deactivate at least one of the heating elements. For example, if less heat provided to the catalyst would still meet the time threshold, energy throughput in the HEV battery may be conserved by deactivating one (or more) of the heating elements. Process 800 may also return to step 208 as shown in FIG. 8, or the process may end.

Figure 9:
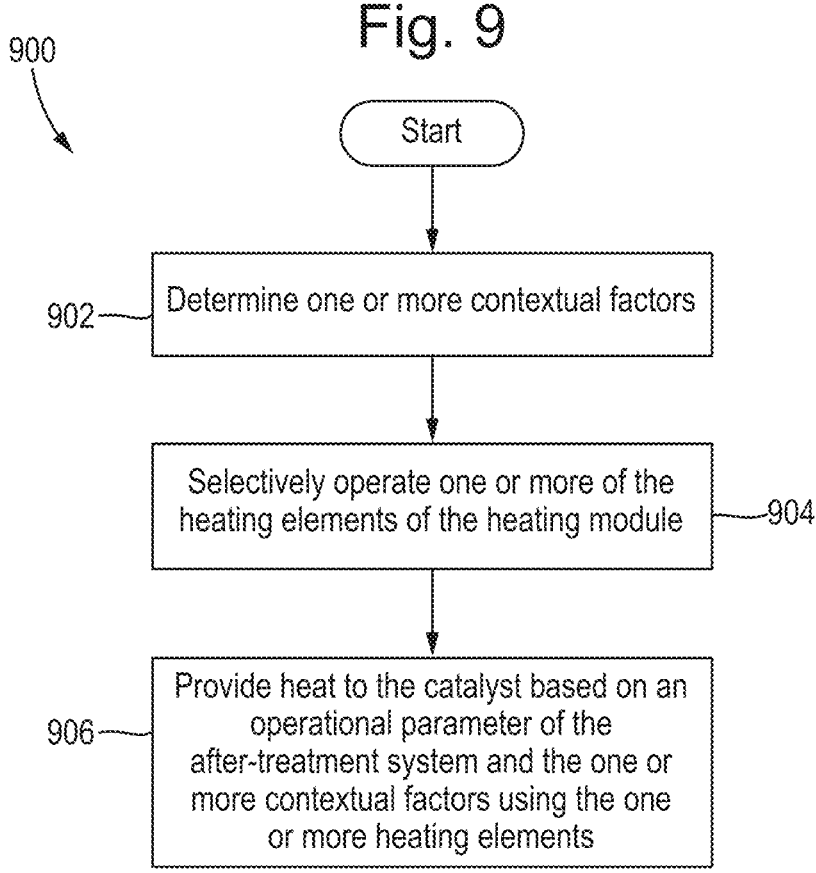

FIG. 9 illustrates an example flow chart of a method of providing heat to a catalyst of an after-treatment system for a vehicle, in accordance with at least one of the examples described herein. In some examples, the after-treatment system comprises a heating module having a plurality of heating elements. Each of the plurality of heating elements is independently operable to provide thermal energy to the catalyst of the after-treatment system. Process 900 starts at step 902. At step 902, one or more contextual factors are determined. In some examples, the one or more contextual factors comprise at least one of an ambient temperature; a state of charge of a power source of the vehicle; a time since the last engine start-up; or a delta temperature between the temperature of the after-treatment system and the ambient temperature.

At step 904, one or more of the heating elements of the heating module are selectively operated. In some examples, the heating elements are selected and operated based on one or more contextual factors. For example, heating elements may be more desirable to select based on their power rating or proximity to the catalyst.

At step 906, heat to the catalyst is provided based on an operational parameter of the after-treatment system, and one or more contextual factors. The heat is provided using one or more heating elements of the heating module. In some examples, in addition to a cold start of the after-treatment system (e.g., an operational parameter) the ambient temperature surrounding the after-treatment system (e.g., a contextual factor) would help the system to better choose a combination of one or more of the plurality of heating elements to ensure that the right amount of heat energy is provided to the catalyst. In such examples, the contextual factors may increase the number of one or more heating elements selected to be operated and provide heat to the catalyst or, conversely, the contextual factors may decrease the number of heating elements selected to be operated and provide heat to the catalyst.

Figure 10:
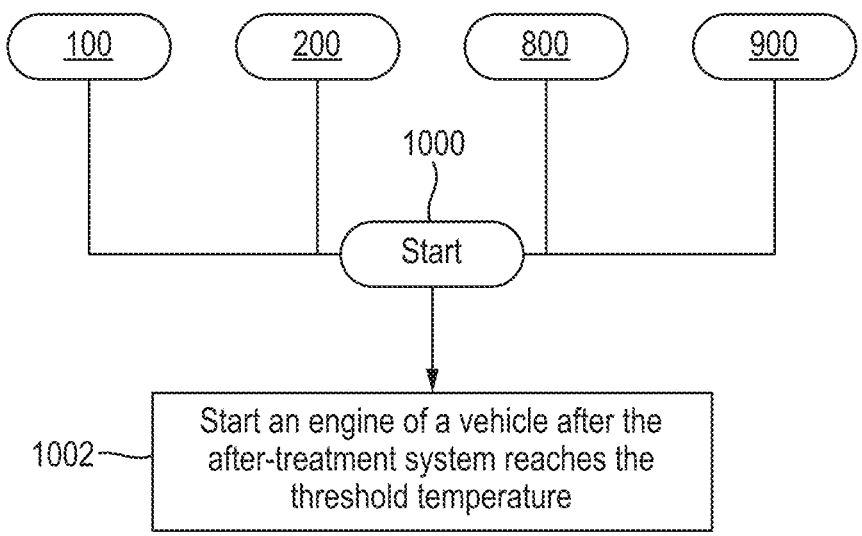

FIG. 10 illustrates an example flow chart of a method of providing heat to a catalyst of an after-treatment system for a vehicle, in accordance with at least one of the examples described herein. In some examples, the after-treatment system comprises a heating module having a plurality of heating elements. Each of the plurality of heating elements is independently operable to provide thermal energy to the catalyst of the after-treatment system. Process 1000 starts after process 100, 200, 800, and/or 900, as described with reference to FIGS. 1, 2, 8, and 9 above, ends. After the end of the above processes, step 1002 may follow.

At step 1002, an engine of the vehicle is started. In some examples, and as shown in process 1000, the engine of the vehicle may be started after the after-treatment system reaches the threshold temperature. However, it is intended to be included in this disclosure that the engine could be started in parallel, after, or prior to any one of the steps as described with reference to processes 100, 200, 800, and 900. The example shown in FIG. 10 however is advantageous because it is ensured that the vehicle will be compliant with the local regulations on vehicle emissions prior to engine start, if the engine is started after one of, or a combination of, processes 100, 200, 800, or 900. In some examples, during a drive cycle, the after-treatment systems, as described previously, could be well above the target temperature, however, the temperature of the system could begin to decrease due to a reduced engine load (e.g., driving around town between traffic lights). In this case, the eCAT would be activated to maintain the temperature—known as heating maintenance—and the engine would have already been started prior to the eCAT being activated.

Figure 11:
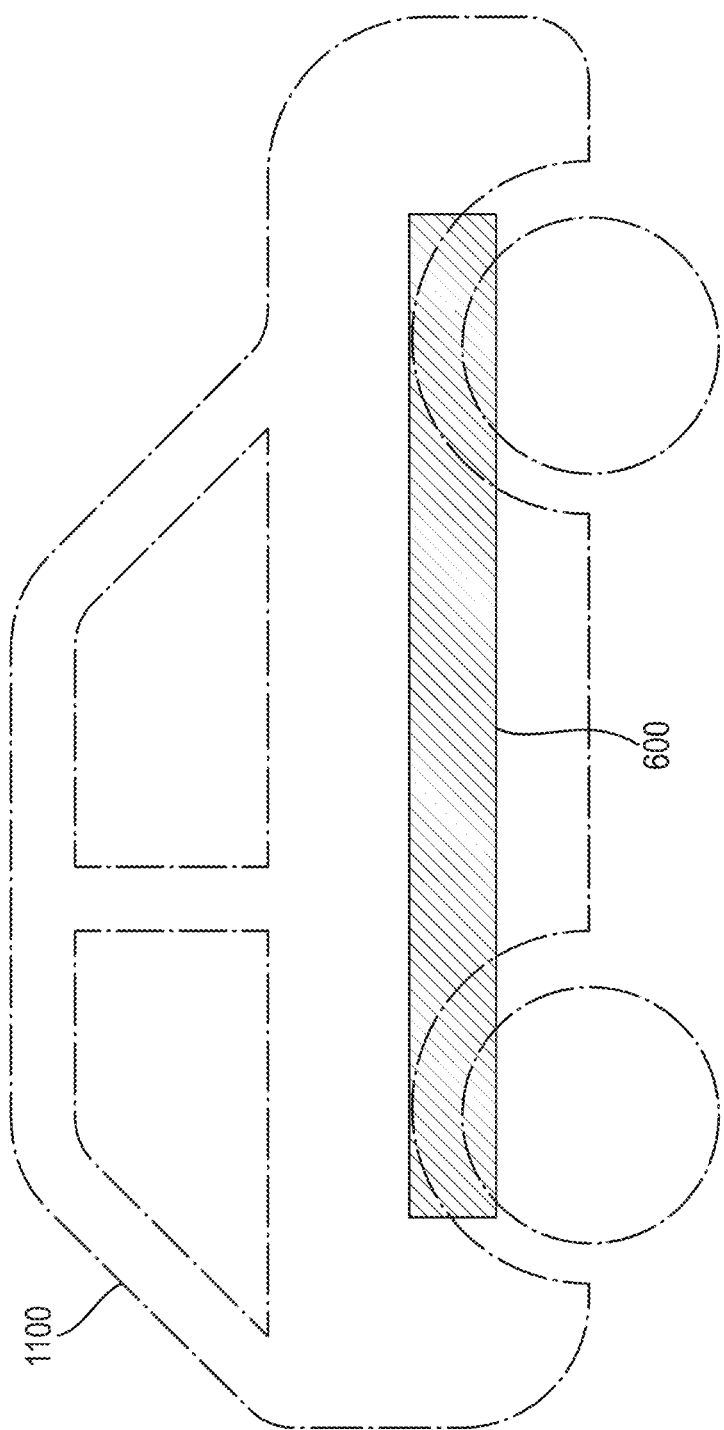
FIG. 11 illustrates a vehicle comprising an engine and an exemplary exhaust system, in accordance with at least one of the examples described herein.

FIG. 11 illustrates a vehicle comprising an exemplary exhaust system, in accordance with at least one of the examples described herein. According to some examples, there is provided a vehicle 1100 comprising an exhaust system 600 as described with reference to FIG. 6. In some examples, the vehicle further comprises a drive train 710 comprising a BISG 712, an engine 610, clutch 716, and transmission 718. The exhaust system 600 may comprise an eCAT as described in any of the examples above.

In some circumstances, any incremental cost to support the plurality of heating elements, e.g., over a single heating element, may be an intermediate cost point between a PWM-based strategy (as described above) and an alternate system, which may include an additional DC-DC converter to control the eCAT load, which increases cost. Further, the solution is advantageous in reducing battery throughput, which is a concern with the PWM switching approach. The proposed solution would enable a reduction of battery throughput, which may mean the additional DC-DC converter approach is not required. Packaging and additional DC-DC converter into the vehicle 1100 system may not be possible and the DC-DC converter would have significant cooling requirements. Accordingly, with the additional throughput over the expected lifetime of the vehicle, the proposed solutions enable additional devices to be supported by the same vehicle 1100 powernet (not shown), without the need to increase the battery capacity and therefore cost. Advantages of the present disclosure are clear, however, it is emphasized that the present teachings reduce the degradation of discharge/charge performance (e.g., through reducing the increase in internal resistance) and battery aging (i.e., helping to maintain durability) over the life of the battery of an HEV system. The present teachings will also apply, however, to any system wherein a battery has high energy throughput and suffers from an increase in internal resistance and battery aging due.

Figure 12:
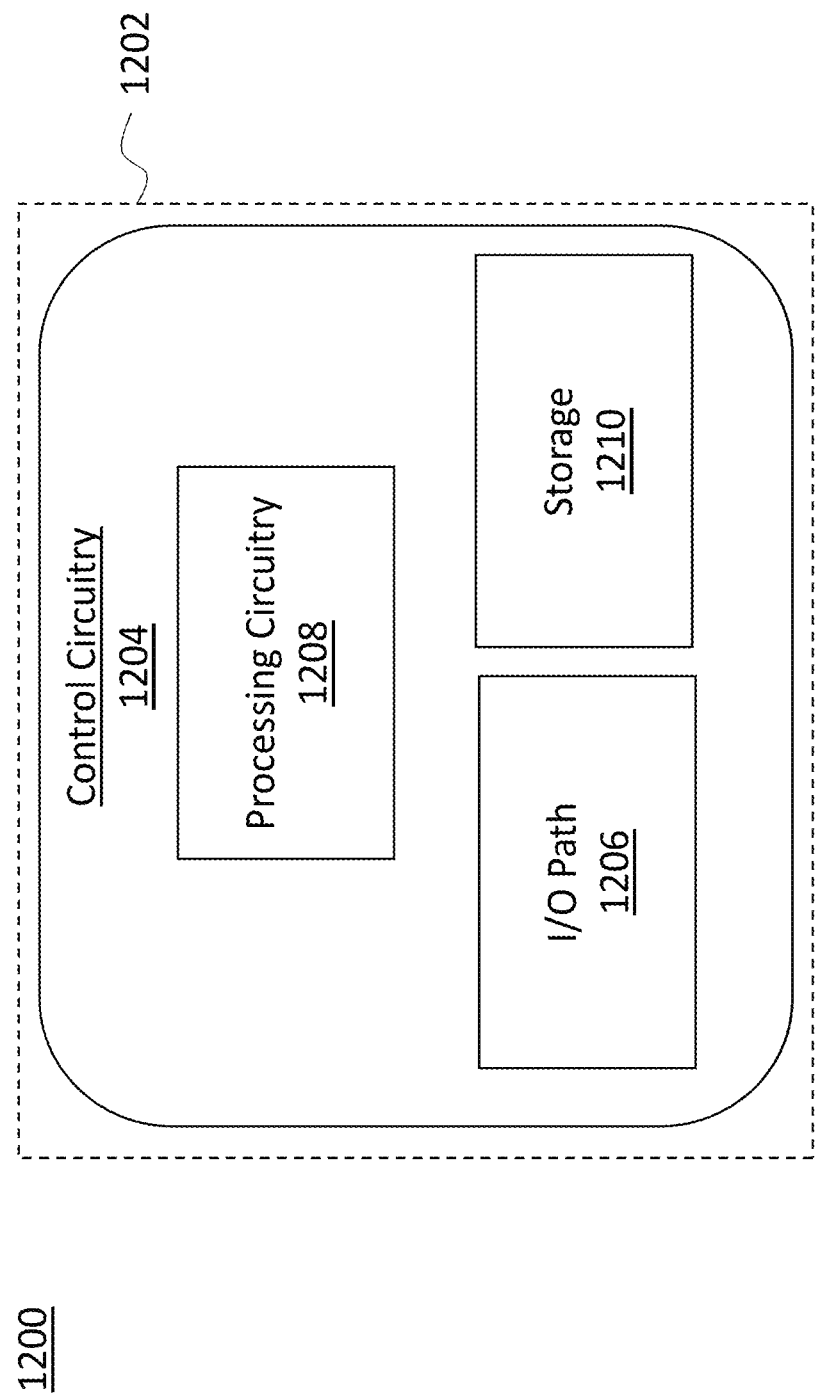
FIG. 12 illustrates a block diagram of a computing module, in accordance with some embodiments of the disclosure.

FIG. 12 illustrates a block diagram 1200 of computing module 1202, in accordance with some embodiments of the disclosure. In some examples, computing module 1202 may be communicatively connected to a user interface. In some examples, computing module 1202 may include processing circuitry, control circuitry, and storage (e.g., RAM, ROM, hard disk, removable disk, etc.). Computing module 1202 may include an input/output path 1206. I/O path 1206 may provide device information, or other data, over a local area network (LAN) or wide area network (WAN), and/or other content and data to control circuitry 1204, that includes processing circuitry 1208 and storage 1210. Control circuitry 1204 may be used to send and receive commands, requests, signals (digital and analog), and other suitable data using I/O path 1206. I/O path 1206 may connect control circuitry 404 (and specifically processing circuitry 408) to one or more communications paths. In some examples, computing module 1202 may be an on-board computer of a vehicle, such as vehicle 1100.

Control circuitry 1204 may be based on any suitable processing circuitry such as processing circuitry 1208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some examples, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some examples, control circuitry 1204 executes instructions for computing module 1202 stored in memory (e.g., storage 1210).

Memory may be an electronic storage device provided as storage 1210, which is part of control circuitry 1204. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Non-volatile memory may also be used (e.g., to launch a boot-up routine and other instructions). Storage 1210 may be sub-divided into different spaces such as kernel space and user space. Kernel space is a portion of memory or storage that is, e.g., reserved for running a privileged operating system kernel, kernel extensions, and most device drivers. User space may be considered an area of memory or storage where application software generally executes and is kept separate from kernel space so as to not interfere with system-vital processes. Kernel mode may be considered as a mode when control circuitry 404 has permission to operate on data in kernel space, while applications running in user mode must request control circuitry 1204 to perform tasks in kernel mode on its behalf.

Computing module 1202 may be coupled to a communications network. The communication network may be one or more networks including the Internet, a mobile phone network, mobile voice or data network (e.g., a 3G, 4G, 5G or LTE network), mesh network, peer-to-peer network, cable network, cable reception (e.g., coaxial), microwave link, DSL reception, cable internet reception, fiber reception, over-the-air infrastructure or other types of communications network or combinations of communications networks. Computing module 1202 may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

In some examples, the control circuitry 1204 is configured to carry out any of the methods as described herein. For example, storage 1210 may be a non-transitory computer-readable medium having instructions encoded thereon, to be carried out by processing circuitry 1208, which cause control circuitry 1204 to carry out a method to provide heat to a catalyst of an after-treatment system for a vehicle, the after-treatment system comprising a heating module having a plurality of heating elements, wherein each of the plurality of heating elements is independently operable to provide thermal energy to the catalyst of the after-treatment system, the method comprising: selectively operating one or more of the heating elements of the heating module to provide heat to the catalyst based on an operational parameter of the after-treatment system.

It should be understood that the examples described above are not mutually exclusive with any of the other examples described with reference to FIGS. 1-12. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed embodiments can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

This disclosure is made to illustrate the general principles of the systems and processes discussed above and are intended to be illustrative rather than limiting. More generally, the above disclosure is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it shall be appreciated that the disclosure is not limited thereto. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some, and/or all features in one aspect can be applied to any, some, and/or all features in any other aspect, in any appropriate combination. It should also be appreciated that particular combinations of the various features described and defined in any aspect can be implemented and/or supplied and/or used independently.

The invention claimed is:

1. A method of providing heat to a catalyst of an after-treatment system for a vehicle, the after-treatment system comprising a heating module having a plurality of heating elements, wherein each of the plurality of heating elements is independently operable to provide thermal energy to the catalyst of the after-treatment system, the method comprising:
   determining how many of the plurality of heating elements to selectively operate to achieve a threshold temperature of the catalyst based on an operational parameter of the after treatment system;
   in response to the determination, selectively operating one or more of the heating elements of the heating module to provide heat to the catalyst.

2. The method of claim 1, wherein the threshold temperature of the catalyst is achieved within a time threshold.

3. The method of claim 1, further comprising:
   in response to determining that the threshold temperature has been achieved, deactivating one of the plurality of heating elements of the after-treatment system.

4. The method of claim 1, wherein the operational parameter comprises at least one of:
   energy throughput of a hybrid battery;
   an engine temperature;
   an exhaust gas flow rate through the after-treatment system;
   a maximum thermal energy output from the plurality of heating elements; or
   an amount of particulate matter in the after-treatment system.

5. The method of claim 1, further comprising determining one or more contextual factors, wherein the one or more contextual factors comprise at least one of:
   an ambient temperature;
   a state of charge of a power source of the vehicle;
   a time since a last engine start-up; or
   a delta temperature between the temperature of the after-treatment system and the ambient temperature; and
   wherein at least one of the plurality of heating elements of the heating module is selectively operated to provide heat to the catalyst based on one or more of the contextual factors.

6. The method of claim 1, further comprising:
   starting an engine of the vehicle after the after-treatment system reaches the threshold temperature.

7. The method of claim 1, further comprising:
   controlling at least one of the plurality of heating elements using at least one pulse-width modulation switch.

8. The method of claim 1, wherein each of the plurality of heating elements are electrically isolated from one another.

9. An after-treatment system comprising:
   a heating module comprising a plurality of heating elements, wherein each of the plurality of heating elements is independently activatable to provide thermal energy to a catalyst of the after-treatment system; and
   a control module to determine how many of the plurality of heating elements to selectively operate to achieve a threshold temperature of the catalyst based on an operational parameter of the after treatment system.

10. The after-treatment system of claim 9, wherein each of the plurality of heating elements have a same thermal output power.

11. The after-treatment system of claim 9, wherein two or more of the plurality of heating elements have a different thermal output power.

12. The after-treatment system of claim 9, wherein the plurality of heating elements are spatially separated.

13. The after-treatment system of claim 9, wherein the plurality of heating elements occupy the same spatial region but are electrically insulated.

14. A vehicle comprising the after-treatment system of claim 9.

15. The after-treatment system of claim 9, wherein each of the plurality of heating elements are electrically isolated from one another.

16. A non-transitory computer-readable medium having instructions encoded thereon for carrying out a method to provide heat to a catalyst of an after-treatment system for a vehicle, the after-treatment system comprising a heating module having a plurality of heating elements, wherein each of the plurality of heating elements is independently operable to provide thermal energy to the catalyst of the after-treatment system, the method comprising:
   determining how many of the plurality of heating elements to selectively operate to achieve a threshold temperature of the catalyst based on an operational parameter of the after treatment system;
   in response to the determination, selectively operating one or more of the heating elements of the heating module to provide heat to the catalyst.

* * * * *